(12) United States Patent
Kaushik

(10) Patent No.: US 9,633,058 B2
(45) Date of Patent: Apr. 25, 2017

(54) PREDICTIVE PLACEMENT OF COLUMNS DURING CREATION OF A LARGE DATABASE

(71) Applicant: International Business Machines Corporation, Armonk, NY (US)

(72) Inventor: Rini Kaushik, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 332 days.

(21) Appl. No.: 14/305,061

(22) Filed: Jun. 16, 2014

(65) Prior Publication Data

US 2015/0363443 A1 Dec. 17, 2015

(51) Int. Cl.
G06F 17/30 (2006.01)

(52) U.S. Cl.
CPC .... *G06F 17/30315* (2013.01); *G06F 17/3053* (2013.01); *G06F 17/30144* (2013.01); *G06F 17/30864* (2013.01)

(58) Field of Classification Search
CPC .............................................. G06F 17/30315
See application file for complete search history.

(56) References Cited

U.S. PATENT DOCUMENTS

| | | | |
|---|---|---|---|
| 5,848,406 A * | 12/1998 | Mani | G06F 17/30392 |
| 6,330,555 B1 * | 12/2001 | Weber | G06F 17/30557 |
| 6,487,641 B1 * | 11/2002 | Cusson | G06F 12/0813 |
| | | | 707/E17.12 |
| 7,024,414 B2 | 4/2006 | Sah et al. | |
| 7,756,873 B2 | 7/2010 | Gould et al. | |
| 8,121,975 B2 | 2/2012 | Averbuch et al. | |
| 8,150,850 B2 | 4/2012 | Herrnstadt | |
| 8,478,775 B2 | 7/2013 | Netz et al. | |
| 2004/0181533 A1 * | 9/2004 | Santosuosso | G06F 17/3056 |
| 2009/0210445 A1 * | 8/2009 | Draese | G06F 17/30315 |
| 2011/0295792 A1 | 12/2011 | Mascarenhas et al. | |

(Continued)

OTHER PUBLICATIONS

Kawabata et al., "InfoFrame DataBooster for High-Speed Processing of Big Data," NEC Technical Journal, v.7, n.2, 2012, pp. 28-32.

(Continued)

*Primary Examiner* — Etienne Leroux
*Assistant Examiner* — Dara J Glasser
(74) *Attorney, Agent, or Firm* — Cantor Colburn LLP; Bryan Butler

(57) ABSTRACT

Methods and arrangements for predictively placing columns of a large database in a multi-tier storage system. Aspects include receiving a database to be stored in the multi-tier storage system, wherein the database comprises a plurality of columns and the multi-tier storage system comprises at least two storage devices and evaluating one or more attributes of each of the plurality of columns of the database. Aspects also include storing each of the plurality of columns of the database on one of the at least two storage devices, wherein a determination of which of the at least two storage devices to store each of the plurality of columns is based on the one or more attributes of each of the columns, a predictive model based on the weighted columnar relationship graph, and the characteristics of the storage devices.

19 Claims, 10 Drawing Sheets

(56) References Cited

U.S. PATENT DOCUMENTS

2013/0159285 A1  6/2013  Dees et al.

OTHER PUBLICATIONS

Guoliang Zhou et al., "Cache Conscious Star-Join in MapReduce Environments," Proceedings of the 2nd International Workshop on Cloud Intelligence, Aug. 26, 2013, ACM, 2013.
U.S. Appl. No. 14/305,179, filed Jun. 16, 2014.
U.S. Appl. No. 14/669,565, filed Mar. 26, 2015.
List of IBM Patents or Patent Applications Treated as Related—Date Filed: Aug. 22, 2015; 2 pages.

* cited by examiner

Q1 = Select c3 where c1=5;
Q2 = select c4 where c1=8, c6=9;
Q3 = select c2,c5 where c1=9;

Q1 = Select c3 where c1=5;
Q2 = select c4 where c1=8;

|  | C1 | C2 | C3 | C4 | Performance | Cost |
|---|---|---|---|---|---|---|
| Q1 | 1 | 0 | 0 | 0 | $cardinality_{c1} * RG_{size}/flash_{BW} + size_{c3}/HDD_{BW}$ | $(\sum size_{c2} + size_{c3} + size_{c4})*\$HDD/GB + \$Flash/GB*size_{c1}$ |
|  | 0 | 1 | 0 | 0 | $(\sum size_{c1} + size_{c3})/HDD_{BW}$ | $(\sum size_{c1} + size_{c2} + size_{c4})*\$HDD/GB + \$Flash/GB*size_{c2}$ |
|  | 0 | 0 | 1 | 0 | $selectivity_{q1} * RG_{size}/flash_{BW} + size_{c3}/HDD_{BW}$ | $(\sum size_{c1} + size_{c2} + size_{c4})*\$HDD/GB + \$Flash/GB*size_{c3}$ |
|  | 0 | 0 | 0 | 1 | $(\sum size_{c1} + size_{c3})/HDD_{BW}$ | $(\sum size_{c1} + size_{c2} + size_{c3})*\$HDD/GB + \$Flash/GB*size_{c4}$ |
|  | 1 | 0 | 1 | 0 | $cardinality_{c1} * RG_{size}/flash_{BW} + size_{c3}/HDD_{BW}$ | $(\sum size_{c2} + size_{c4})*\$HDD/GB + (\sum size_{c1} + size_{c3})*\$Flash/GB$ |
|  | 1 | 0 | 0 | 1 | $cardinality_{c1} * RG_{size}/flash_{BW} + selectivity_{q1} * RG_{size}/flash_{BW}$ | $(\sum size_{c2} + size_{c3})*\$Flash/GB + size_{c3} * \$HDD/GB$ |
|  | 1 | 1 | 1 | 1 | $cardinality_{c1} * RG_{size}/flash_{BW} + selectivity_{q1} * RG_{size}/flash_{BW}$ | $(\sum size_{c1} + size_{c2} + size_{c3} + size_{c4})*\$Flash/GB$ |
|  | 1 | 1 | 0 | 0 | $cardinality_{c1} * RG_{size}/flash_{BW} + size_{c3}/HDD_{BW}$ | ⋮ |
|  | 1 | 1 | 0 | 1 | $cardinality_{c1} * RG_{size}/flash_{BW} + size_{c3}/HDD_{BW}$ | ⋮ |
| Q2 | ⋮ | 0 | 0 | 0 | ⋮ | ⋮ |
| Q3 | 1 | 0 | 0 | 0 | ⋮ | ⋮ |
|  | 1 | 0 | 0 | 1 | ⋮ | ⋮ |
|  | ⋮ | ⋮ | ⋮ | ⋮ | ⋮ | ⋮ |

FIG. 7

| Columns | Popularity | Sorted | Cardinality | Total Rows | Field Size |
|---|---|---|---|---|---|
| o_orderkey | 10 | yes | 1 | 1500000 | 4 |
| l_orderkey | 9 | yes | 0.249949 | 6001215 | 4 |
| s_suppkey | 9 | yes | 1 | 10000 | 4 |
| l_shipdate | 8 | no | 0.000421 | 6001215 | 8 |
| s_nationkey | 8 | no | 0.0025 | 10000 | 4 |
| c_custkey | 7 | yes | 1 | 150000 | 4 |
| n_nationkey | 7 | yes | 1 | 25 | 4 |
| o_custkey | 7 | no | 0.066664 | 1500000 | 4 |
| p_partkey | 7 | yes | 1 | 20000 | 4 |
| l_partkey | 6 | no | 0.033327 | 6001215 | 4 |
| l_suppkey | 5 | no | 0.001666 | 6001215 | 4 |
| o_orderdate | 5 | no | 0.001604 | 1500000 | 8 |
| ps_suppkey | 5 | no | 0.0125 | 800000 | 4 |
| c_nationkey | 4 | no | 0.000167 | 150000 | 4 |
| l_quantity | 4 | no | 8.33E-06 | 6001215 | 8 |
| ps_partkey | 4 | yes | 0.25 | 800000 | 4 |
| n_name | 3 | yes | 1 | 25 | 25 |
| p_brand | 3 | no | 0.00125 | 20000 | 10 |
| p_size | 3 | no | 0.0025 | 20000 | 4 |

FIG. 9

PREDICTIVE PLACEMENT OF COLUMNS DURING CREATION OF A LARGE DATABASE

BACKGROUND

The present invention relates to large database systems such data warehouses on Hadoop, and more specifically, to predictively placing columns of a database in a multi-tier storage system during ingestion of data in the database.

As used herein, a large database is a columnar or hybrid columnar database which stores data tables as sections of columns of data rather than as rows of data and that includes at least one petabyte of data. Such large databases are currently used for a variety of applications in which very large amounts of data is stored, queried, aggregated, analyzed and searched such as business data analytics applications. Modern business data analytics applications compute aggregates over a large amount of data to roll-up information along an increasing number of dimensions such as geographic regions, demography, users, products, etc. Traditionally, online business analytics databases executed such queries by performing sequential scans over a significant portion of the database. As a result of the increasing sizes and dimensions, and increasing importance of interactive query response times of today's large analytics databases, querying the database by scanning the entire large database is not feasible. In addition to the size of large databases other factors make low latency querying of large databases with known techniques difficult. For example, in online analytics databases the percentage of database queries that are ad hoc in nature is high, which makes the creation of an index for the large database difficult. The large number of dimensions render techniques such as pre-computed cubes very space and computationally exorbitant. Simple caching solutions may not work either as the data may be too large to be cached (a large number of the analytics queries access both historical and recent data), it may have gotten overwritten by lengthy ingest, or ad-hoc queries may end up accessing data that wasn't accessed earlier. As a result, ability to quickly access un-cached data from storage plays an important role in interactive processing of ad-hoc queries.

Currently, these large analytics databases are stored on traditional data storage devices such as hard disk drives and the like. Recently, in an attempt to improve the performance of the large columnar databases, some large databases have been stored on high performance storage devices such as solid state devices or flash memory and the like. Flash offers a 40-1000× improvement in random accesses and allows much higher degree of internal IO parallelism than disks as flash devices are built on an array of flash memory packages. RAM's volatility mandates an additional durable copy of the data in a non-volatile medium, resulting in significant data duplication. Flash is non-volatile and hence, obviates the need to have data duplication; it can serve as the primary and the only tier for the data. We make a case for leveraging high performance, non-volatile, small footprint, and low power storage mediums such as flash in the Big Data storage hierarchy as a durable storage tier.

While storing large databases on high performance storage devices increases the speed of some queries on the large databases, the increased performance comes at a high cost as high performance storage devices are much more expensive than traditional data storage devices. A majority of the known database storage tiering techniques aim to place popular, frequently accessed data on the high performance, randomly accessible tier such as a Flash tier. The data popularity is determined in a reactive manner, whereby, a module records the access patterns of the workload and if a data set starts to get accessed a lot, it is deemed popular and is moved to the high performance tier. Such reactive techniques suffer from a reaction time to determine the access patterns and are unable to provide upfront performance guarantees to adhoc queries. Furthermore, a majority of these techniques are at much lower block-level and do not have semantic knowledge about the data at columnar level.

Flash is more expensive and has less space than HDD. It is important to place the right subset of columns in flash that yield highest performance per dollar in order to justify the higher cost of flash. All columns are not alike and won't yield the same performance increase by being placed in the flash. Flash yields highest performance when data is accessed randomly as flash is 40-1000× faster than HDD for random IOPs and only 2-7× faster for sequential accesses.

BRIEF SUMMARY

Exemplary embodiments include methods, systems and computer program products for predictively placing columns of a large analytics database in a multi-tier storage system. Aspects include receiving a database to be stored in the multi-tier storage system, wherein the database comprises a plurality of columns and the multi-tier storage system comprises at least two storage devices and evaluating one or more attributes of each of the plurality of columns of the database. Aspects also include storing each of the plurality of columns of the database on one of the at least two storage devices, wherein a determination of which of the at least two storage devices to store each of the plurality of columns is based on the one or more attributes of each of the columns, a predictive model based on the weighted columnar relationship graph, and the characteristics of the storage devices.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 depicts a matrix that can be used for training using query logs in accordance with an exemplary embodiment;

FIG. 9 depicts a chart illustrating a ranking of columns based on cardinality and popularity in accordance with an exemplary embodiment.

DETAILED DESCRIPTION

Exemplary embodiments include methods, systems and computer program products for predictively placing columns of a large database in a multi-tier storage system during creation of the large database. As used herein, a large database is a columnar or hybrid columnar database which stores data tables as sections of columns of data rather than as rows of data and that includes at least one petabyte of data. In exemplary embodiments, during data ingestion data into a large database, attributes of the columns and relationship between columns are evaluated and the columns are stored on different storage devices based on the column attributes. The attributes of the columns includes, but are not limited to, selectivity, cardinality, size, sparsity, type, usage, access patterns, sort order, and data distribution.

The invention proposes predictive data placement that predictively and autonomic ally determines optimal tier for the incoming columnar data and places the data upfront on the right tier. Such predictive data placement stands to yield upfront performance guarantees and reduce data movement between the storage tiers.

High performance, randomly accessible storage devices such as Flash are much more expensive and have smaller capacities than HDDs. Also, Flash offers 40-1000× higher random IOPs than HDD, while the sequential bandwidth is only 2-7× higher than HDD. Thus, placing data that is only going to get sequentially accessed on Flash stands to achieve lower performance per dollar than placing data that is mostly going to be randomly accessed. Not all the popular data yields high performance per dollar by getting placed on high performance, randomly accessible tier. Hence, the invention involves a placement decision making mechanism that carefully chooses the right subset of columnar data to be placed on the most conducive tier to attain optimal performance per dollar.

In exemplary embodiments, historical and run-time query information for the large database may also be used to select the storage device that each column is stored on. The historical query information includes the type of usage for each column in the query (e.g., select clause (i.e., projection), where clause (i.e., selection), join, etc.), the selectivity of the query, etc. The historical query information is used to create an inter- and intra-query column relationship graph where the edges define the selection/projection/join relationship between any two columns in a query. Each relationship edge has a weight associated with it which is determined by using an optimization algorithm that seeks to maximize performance per dollar of the queries subject to capacity constraints. In embodiments in which historical query logs are not present, the column relationship graph is constructed during run-time based on the incoming queries. At the ingestion time, each column is assigned a score. Columns with higher scores are placed on higher performance storage devices.

Figure 1:
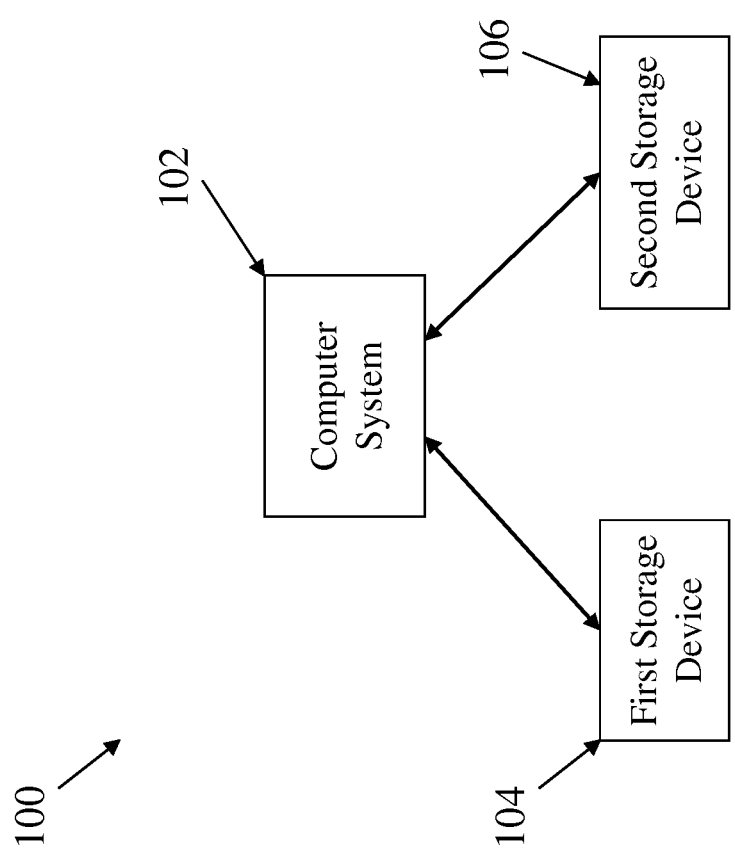
FIG. 1 depicts a block diagram of a multi-tier storage system used for storing a large analytics database in accordance with an exemplary embodiment.

Referring now to FIG. 1, a block diagram of a multi-tier storage system 100 for storing a large database in accordance with an exemplary embodiment is shown. As illustrated the system 100 includes a computer system 102 which is in communication with a first storage device 104 and a second storage device 106. In exemplary embodiments, the first storage device 104 includes one or more high performance, randomly accessible storage devices such as Flash and the second storage device 106 includes one or more low performance storage devices, such as HDDs. In exemplary embodiments, the computer system 102 is configured to receive a large database and to store at least one column of the large database on each of the first storage device 104 and the second storage device 106. In exemplary embodiments, the determination of which of the first storage device 104 and the second storage device 106 that each column should be stored on is based on the attributes of the columns and on any available historical and run-time query information.

In exemplary embodiments, columns of large database which are more likely to be randomly accessed are stored in the first storage device 104 and columns that are more likely to be sequentially accessed are stored in the second storage device 106. For example, if a where column (i.e., column in the selection clause of the query) has low cardinality, it will mostly benefit from getting accessed sequentially as a large number of row positions may match the predicate and should therefore be stored in the second storage device 106. On the other hand, a column with high cardinality may match only a few row has more chances of getting accessed randomly and be stored on the first storage device 104. In exemplary embodiments, by only storing columns of the large database which are more likely to be randomly accessed in first storage device 104, the performance gains per dollar realized by the first storage device 104 can be maximized.

In exemplary embodiments, the determination of which columns of the large database to store on the first storage device 104 may also be based on the characteristics of the first storage device 104 and the second storage device 106. The characteristics of the first storage device 104 and the second storage device 106 may include, but are not limited to, sequential access time, random access time, capacity, latency, and the like. In one embodiment, if a column of the large database is likely to be accessed randomly it may not be stored on the first storage device 104 if it is determined that the column will exceed a threshold percentage of the capacity of the first storage device 104. In exemplary embodiments, the performance characteristics of the first storage device 104 and the second storage device 106 are very different and the selection of which device to store each column on is designed to take advantage of these differences.

In exemplary embodiments, each of the columns of the large database may be given a score by the computer system 102 based on the ranking of the intra- and inter-query weighted column relationship graph. In exemplary embodiments, the score represents the likely performance gain per dollar that will be realized by storing the column on the first storage device 104 rather than the second storage device 106. The columns to be stored on the first storage device 104 are then selected based on the score for each column, the size of each column and the capacity of the first storage device 104. A common way to exploit high performance storage devices is to place frequently accessed, popular data on such devices. However, such a naïve technique does not yield optimal performance per dollar. Hence, in exemplary embodiments, not all popular columns will be placed in the first storage device 104. For example, a column that is accessed very frequently but in a sequential manner may not have a high enough score to be selected for storing it in the first storage device 104 if the first storage device is flash. The columns that are typically projected, are assigned a higher weight than the columns that are typically in the selection side of the query. An optimized projection algorithm can involve frequent seeks to the row positions that match the predicates and small random reads of just the column values stored at the row position. Such random accesses are a great fit for randomly accessible memory such as flash Part of the information (such as a dictionary of the unique values) of the columns that typically occur in the selection clause is kept by default on the first storage device. The ranking will determine the placement only of the remaining part of the columnar data that contains row positions for each unique value.

Figure 2:
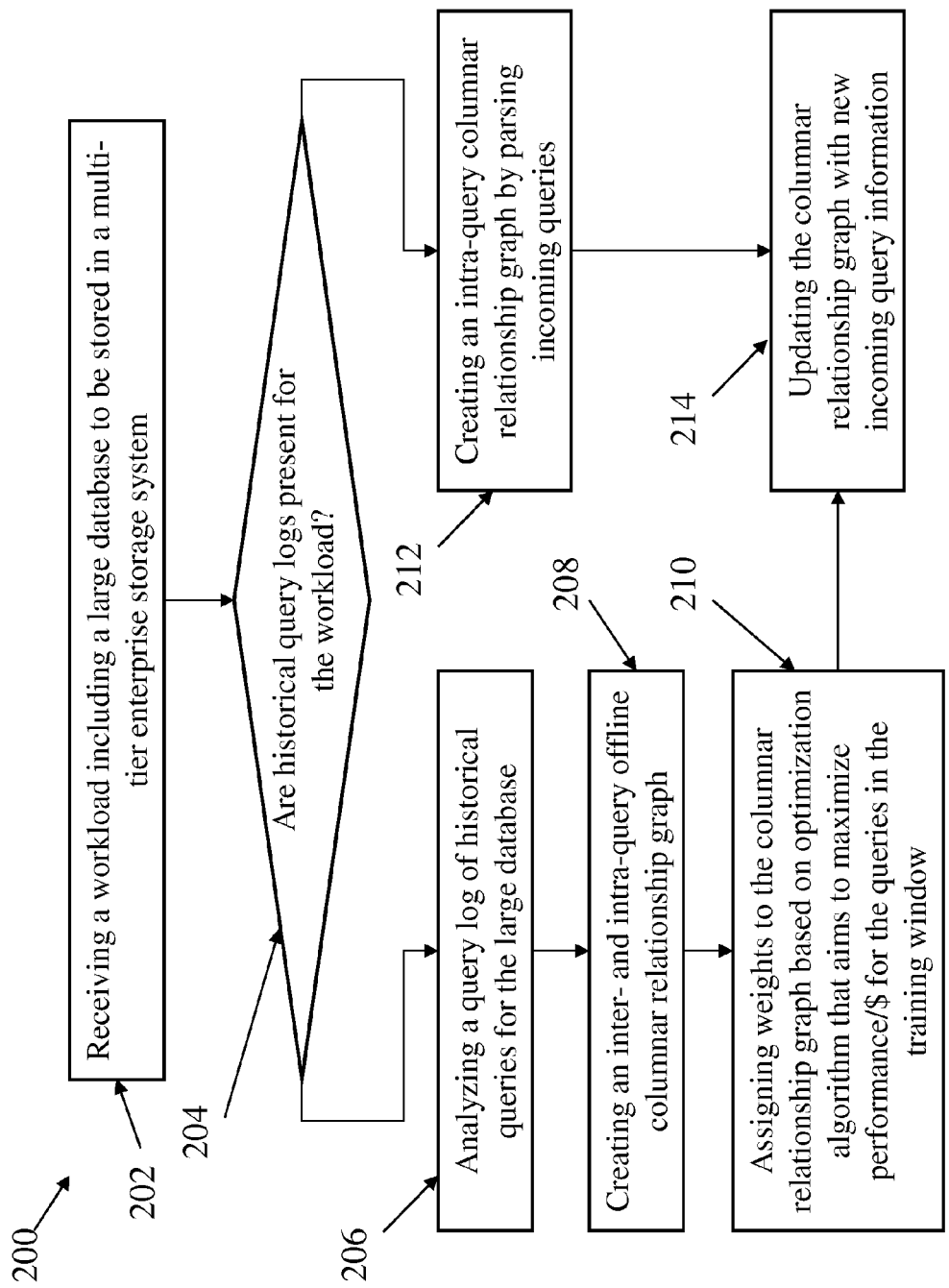
FIG. 2 depicts a flowchart diagram of offline and run-time creation of predictive model to guide run-time columnar data placement in accordance with an exemplary embodiment.

In exemplary embodiments, the determination of which storage device of the multi-tier storage system that each column should be stored on may also be based on historical and/or run-time query information for the large database. Referring now to FIG. 2, a flow chart diagram illustrating a method 200 for generation of the predictive model that is used to guide the run-time columnar data placement decision in accordance with an exemplary embodiment is shown. As shown at block 202, the method 200 begins by receiving a large database to be stored in a multi-tier storage system. Next, as shown at decision block 204, the method 200 includes determining if historical query logs present for the database. If historical query logs are present, the method 200 proceeds to block 206 and analyzes a query log of historical queries for the large database. Next as shown at block 208, the method 200 includes creating an inter- and intra-query weighted column relationship graph based on the analysis. In exemplary embodiments, each column in a query is connected to other columns in the same query based on its occurrence in the selection, projection, or join clause. For example, two columns that both occur in the projection clause will be connected by a select-select relationship. If one column occurs in the selection clause and other in the projection clause, they will be connected by a select-where relationship. As shown at block 210, the method 200 also includes assigning weights to the columnar relationship graph based on optimization algorithm that aims to maximize performance per dollar for the queries in the training window.

If historical query logs are not present, the method 200 proceeds to block 212 and the predictive model in form of column relationship graph is created during run-time by parsing the incoming queries. In exemplary embodiments, for select clauses (i.e., the columns that are being projected) the distribution of the rows examined/projected by the historical and run-time queries which have the column in the select clause will be evaluated. If the percentage of rows examined by the select clause is low it indicates that the column can stand to gain performance by getting accessed randomly only at desired row positions. However, if the percentage of rows examined by the select clause is higher than a selectivity threshold, it indicates that the column should rather be accessed sequentially. As shown at block 214, the method 200 also includes updating the columnar relationship graph with new incoming query information.

Accordingly, in exemplary embodiments, the projection columns that stand to gain performance by getting randomly accessed will be assigned a higher weight so that they have a higher chance of being stored in the first storage device. On the other hand, the columns that would rather be accessed sequentially will be assigned a lower weight so that they will have a lower chance of being stored in the second storage device.

In exemplary embodiments, analyzing the query log includes building an intra-query relationship graph between columns of the large database and assigning a weight to each relationship, or edge between connected columns, based on the contribution of the relationship on performance. Once the weights are assigned, the columns are ranked based on a score which is the sum of the weights of the incoming edges. In exemplary embodiments, the values of the weights are determined by modeling the performance experienced by each column in each query in the historical log and maximizing the performance subject to constraints, such as the size of the first storage device.

In one embodiment, if a column is deemed popular as a projection column and the query log indicates that a low percentage of rows are typically examined in the queries involving the column, the placement of the column in the first storage device has the potential to result in a factor of 40×-1000× (i.e., the factor of difference in the random IOPs of the first storage device compared to the second storage device) performance improvement over placement of the column in the second storage device. In addition, if the first storage device allows high internal IO parallelism, the placement of the column in the first storage device will result in even more performance improvement over placement of the column in the second storage device. In another embodiment, if a column is deemed popular as a projection column and the query log indicates that a high percentage of rows are examined in the queries involving the column, the placement of the column in the first storage device will result in only a factor of 2×-7× gain (i.e., the factor of difference in the sequential bandwidth of flash as first storage device compared to HDD as the second storage device) in performance versus placement of the column in the second storage device. In other embodiment, if a column is deemed popular as a selection column and the column has high cardinality, only a few row positions stand to match exact predicate checks. It would be valuable for the selection algorithm disclosed in patent TODO to be able to just skip to the row position blobs and do a small random read of the row positions of interest. Such a high cardinality selection column will stand to gain performance by being placed in flash. A low cardinality column, will mostly involve sequential accesses of relatively large row position blobs and hence, is more suitable for HDD. Such heuristics guide the weight allocations in the intra-query columnar graph used by the placement algorithm.

Figure 3:
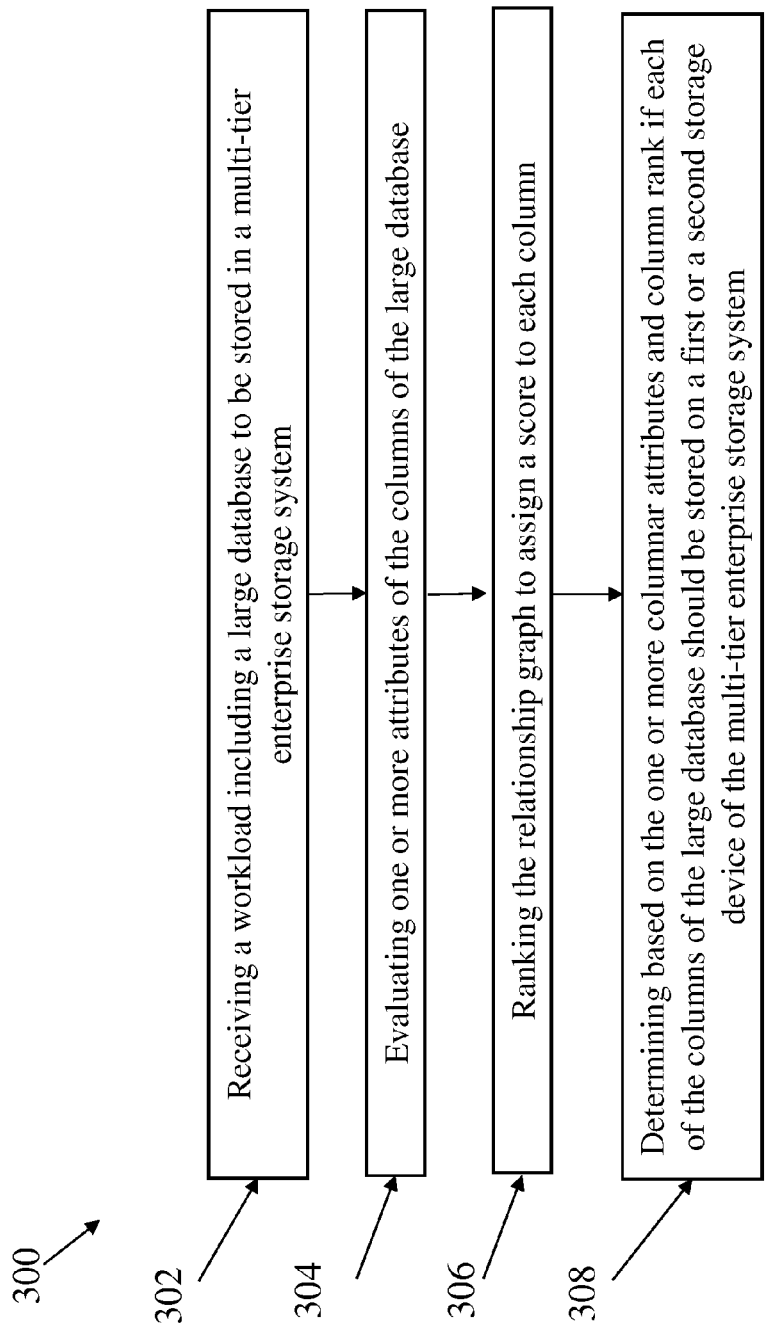
FIG. 3 depicts a flowchart diagram of a method for predictively placing columns of a large database in a multi-tier storage system during ingestion of data in the large database in accordance with an exemplary embodiment.

Referring now to FIG. 3, a flowchart diagram of a method 200 for predictively placing columns of a large database in a multi-tier storage system during creation of the large database in accordance with an exemplary embodiment is shown. As illustrated at block 302, the method 300 includes receiving a large database to be stored in a multi-tier storage system. Next, as shown at block 304, the method 300 includes evaluating one or more attributes of the columns of the large database. Next, as shown in block 306, the weighted columnar relationship graph is ranked and the associated rank of a column is used to guide its placement in the storage hierarchy. As illustrated at block 308, the method 300 includes determining based on the one or more attributes if each of the columns of the large database should be stored on a first or a second storage device of the multi-tier storage system. In exemplary embodiments, the determination of which storage device of the multi-tier storage system each column should be stored on may also be based on one or more characteristics of the storage devices of the multi-tier storage system.

In exemplary embodiments, after the large database has been loaded into the multi-tier storage system the computer system will monitor the use of the large database and will periodically move columns of the large database between the first storage device and the second storage device. Accordingly, the computer system will react to changes in the column popularity and the relationships between columns in run-time based on the incoming analytic queries. The intra-column relationship graph and the column ranking will change in reaction to the patterns exhibited by the run-time queries. The future data placement decisions will also change accordingly.

Flash is more expensive and has less space than HDD. It is important to place the right subset of columns in flash that yield highest performance/$ in order to justify the higher cost of flash. All columns are not alike and won't yield the same performance/$ by being placed in the flash. Flash yields highest performance/$ when data is accessed randomly as flash is 40-1000× faster than HDD for random IOPs and only 2-7× faster for sequential accesses. Placing a column that is likely to get accessed randomly will yield more bang for the buck with flash vs. a column that is only going to get accessed sequentially.

A simple way of splitting the columns across flash tier and HDD tier is to place the popular columns in the flash tier. Even in databases with a high percentage of ad hoc queries, some columns are inherently more popular either as selection or as projection columns across queries. While the predicate values, and order and number of the columns changes across the queries, some columns do tend to appear more than others as either projection or selection columns.

In exemplary embodiments, the methods described herein use a novel predictive column placement model in multi-tier storage system that takes into account several additional factors in addition to column popularity to yield optimal performance/$ across queries. The method considers various attributes of the columns such as their cardinality, sort order, sparsity, and size in its column tiering decision. In addition, the method includes training the placement model by analyzing historical (if available) and run-time query logs. If historical query logs are not present, the method trains the model run-time using a configurable window of run-time queries. An intra- and inter-query weighted column relationship graph is created using the query log and weights are assigned using an optimization algorithm which considers the column characteristics and its impact on enhancing the performance/$ by getting placed on flash.

Figure 5:
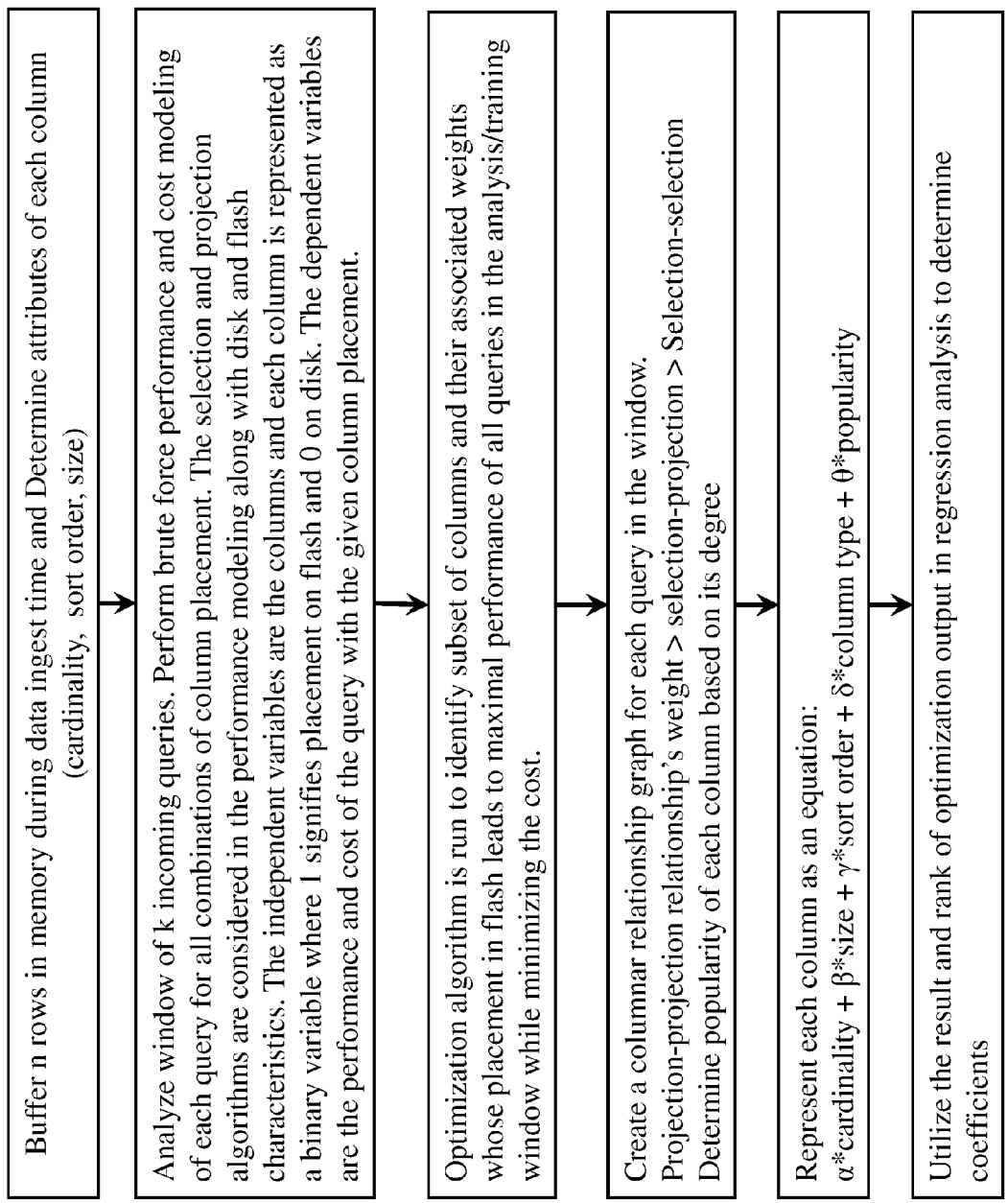
FIG. 5 depicts a flowchart diagram of a training algorithm for predictive column placement into the flash memory versus a hard disk drive in accordance with an exemplary embodiment.
Figure 6:
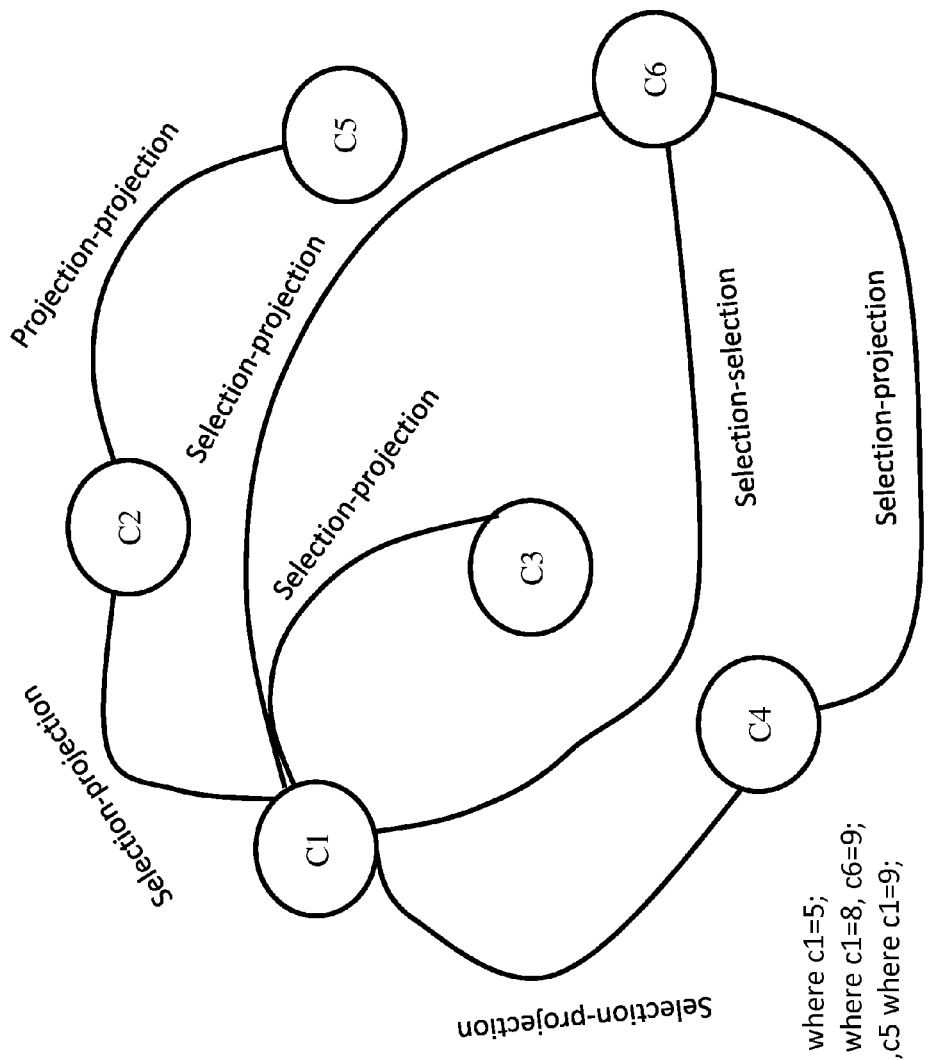
FIG. 6 depicts a state diagram illustrating intra-query and inter-query column relationship drive in accordance with an exemplary embodiment.

A configurable number of queries either in the historical or run-time query log can be used for training the predictive column placement model as illustrated in FIG. 5. An intra- and inter-query column relationship graph is created for all the queries in the query window as shown in FIG. 6. The relationships between the columns can be either selection-selection, projection-selection, or projection-projection. A higher weight is assigned to the projection-projection relationship as selection algorithm stands to gain the most from being placed in flash and if any one projection column is not placed on flash, it brings down the query. Columns in selection-selection get the least weight as the performance doesn't get as affected by partial placement of some columns in flash. Every column's rank is characterized as:

$$\text{rank}(c_i) = \alpha * \text{cardinality} + \beta * \text{size} + \gamma * \text{sort\_order} + \delta * \text{column\_type} + \theta * (\Sigma SS(i,j)) + \pi * (\Sigma SP(i,j)) + \phi * (\Sigma PP(i,j)) \quad (1)$$

Where, cardinality is the percentage of unique values in the column, sort order is 1 if the column is sorted and 0 otherwise, popularity is the number of times the column occurs in the queries in the window of consideration, column type specifies the way a column is used in the query and is 0 for selection columns, 1 for projection columns, and 2 if a column is used in both ways. In the summations, j belongs to the list of neighbors that are in corresponding relationship (SS for selection-selection, SP for selection-projection, and PP for projection-projection) with i. The weights of the relationships are dependent on the selectivity of the queries in the training data.

In exemplary embodiments, if the selectivity of the query is low (i.e., very few row positions match the predicate), the projection algorithm does a point access to the file offset of the row position to read the value of the projection column. This translates to random accesses and placement of these projection columns in flash yields high performance per dollar gain. On the other hand, if the selectivity of the query is high, and a large number of row positions match the predicate, the projection algorithm reverts to a sequential mode in which it clusters the row positions and reads in large chunks of data from the projection columns. Placement of the projection columns in flash won't yield as high a performance per dollar gain as the previous scenario. Thus, selectivity of the query has an impact on the performance of a column in flash.

For each query, a matrix of all possible combinations of column placement is used as the independent variable as shown in FIG. 7. For example, if a query has 7 columns, there are 128 column data placement combinations possible. A column is represented as a binary where 1 signifies placement on flash and 0 placement on disk. The speedup observed in the query latency (i.e., baseline query latency/ tiered query latency) and the cost of the placement form the dependent variables. The cost of a column placement combination is simply a factor of its size*cost of flash memory/ GB for the columns placement in flash and size*cost of disk/GB for the columns supposed to be on disk. Every column combination's impact on the query performance (i.e., speedup) is modeled for each query in the query window. The performance characteristics of the hard disk and flash (e.g., bandwidth) are considered in the modeling in addition to the characteristics of the column and the selectivity of the queries.

For simplicity, we assume query latency to be the sum of the expected time required for accessing each individual column in the query. Let C=c1, c2, . . . , ck be the columns occurring in a query.

$$E[Q] = \sum_{i=1}^{k} E[c_i] \quad (2)$$

Let $y_i$ be the label that denotes whether column $c_i$ is placed in flash or in HDD.

$$y[i] = \begin{cases} 1 & \text{if } c_i \text{ is on flash} \\ 0 & \text{if } c_i \text{ is on HDD} \end{cases} \quad (3)$$

The performance modeling is based on the selection and projection algorithms discussed earlier. The query latency is calculated as follows if $c_i$ is residing on flash and is a selection column:

$$E[c_i] = (\text{cardinality}_i * RGsize + \text{selectivity}(q) * 4 / BW_{flash} \quad (4)$$

As per selection algorithm, each row group is processed in parallel and from each row group, first the unique values are read which correspond to cardinality$_i$*RG size and then matching row positions are read which correspond to selectivity(q)*4, where selectivity(q) is the selectivity of the query being modeled and 4 is the size of each row position. The baseline query performance is determined by reading each column in the query sequentially using disk bandwidth numbers.

If $c\_\{i\}$ is residing on flash and is a projection column, query latency is calculated as follows:

$$E[c_i] = \text{selectivity}(q) * \text{fieldsize}_i / BW_{flash} \quad (5)$$

Where, selectivity(q) is the selectivity of the query and fieldsize$_i$ is the field size of column ci. This is an approximation of the projection algorithm.

If i is residing on disk, it is read in its entirety as is the case with the state-of-the-art algorithms. E[ci]=sizei/BWhdd, where sizei is the total size of the column in the file. The resulting matrix is optimized to yield an ordered set of columns that yield the maximum speed-up for all queries while minimizing the cost when placed on flash. The resulting set of columns is then used to determine the values of coefficients $\alpha$, etc. using regression analysis. The rank equation is used to determine the rank of every new column that appears in the data set to determine its placement in the storage hierarchy. Columns are ranked and the column rank is used in determining the placement of the column in the flash; highest ranking columns are placed in flash. In every training round, the query graph is regenerated using the queries in the window and the coefficients are re-determined to ensure currency of the predictive model.

Figure 8:
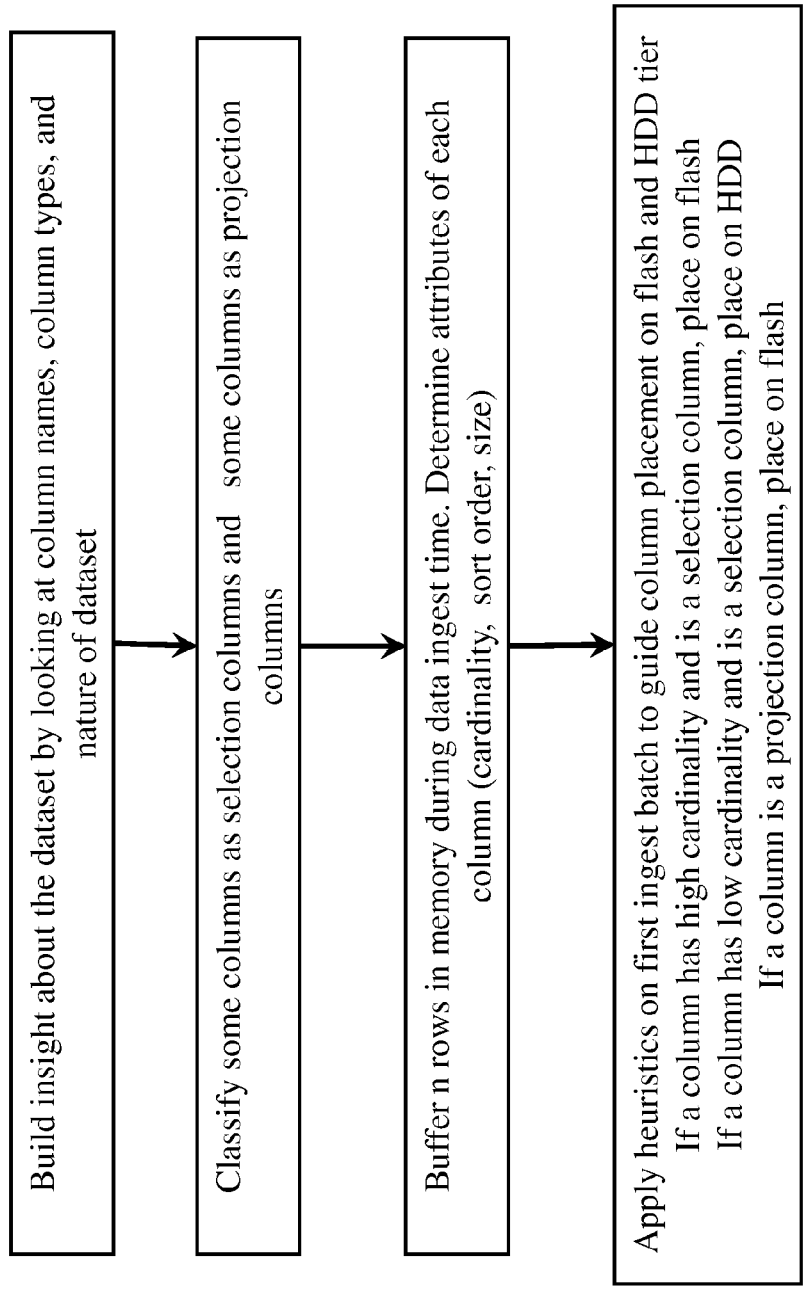
FIG. 8 depicts a flowchart diagram of a bootstrapping algorithm for initial placement decision at the time of database creation in accordance with an exemplary embodiment.

At the time of the initial creation of the database, and in absence of historical query logs for similar databases, a bootstrapping placement algorithm decides the initial placement of the columns based on observed column characteristics and heuristics as illustrated in FIG. 8. In the first step, a configurable number of rows being ingested are buffered in memory. The characteristics (e.g., cardinality, sort order, etc.) are learnt from the buffered rows. In exemplary embodiments, the bootstrapping algorithm also needs to know the potential usage of the columns as selection or projection columns. It also attempts to figure out potential popularity of the columns. Potential popularity columns can be done in multiple ways: 1) hints provided by the user, 2) insights garnered from the dataset, field types, names, etc. For example, in a table, the primary and foreign keys tend to occur in a large number of queries and hence, are inherently popular selection columns. In a financial dataset, columns with monetary attributes (e.g., tax, discount, price, salary, etc.) tend to be popular projection columns for aggregation queries. For example, in the TPCH dataset which is modeled after financial datasets, in the line item table, l_discount and l_xtendedprice are the most popular projection columns.

Heuristics discussed next are then used to determine the placement of the columns based on the characteristics determined earlier. The heuristics are informed by the projection and selection algorithms. To understand the intuition behind the heuristics, we discuss the placement decision of selection columns which is informed by the selection algorithm. The first part in the algorithm involves a sequential read of the unique values for performing predicate match. The second part has potential for much more random accesses as it involves reading row position blobs for each value that matches the predicate. If the row position blobs are small in size and if a large number of unique values match the predicate, the second part of the algorithm leads to a large number of random accesses. Such scenario occurs when the cardinality of the column is high and placing such a column in flash will yield higher performance per dollar of the selection algorithm. On the other hand, if the row position blobs are very large in size, fetching the row position blobs after the predicate match results in a few number of large sequential accesses; a scenario typical with column with low cardinality. Placing such a column in flash allows lower performance per dollar of the selection algorithm. Size of the column also plays a similar role in the performance per dollar yield. In exemplary embodiments, the placement heuristic ranks higher the columns with high cardinality.

In one example, as illustrated in FIG. 9, the top 20 most popular columns out of the total 61 columns in the TPCH dataset. Column L_SHIPDATE is one of the most popular columns; however, its cardinality (i.e., number of distinct values) is one of the lowest. As a result, in spite of being high in popularity, it gets ranked lower by the flash column placement algorithm. Rank of projection columns is inherently assigned higher value than selection columns. Finally, columns are ranked and higher ranked columns are placed on flash subject to its space constraints.

Figure 10:
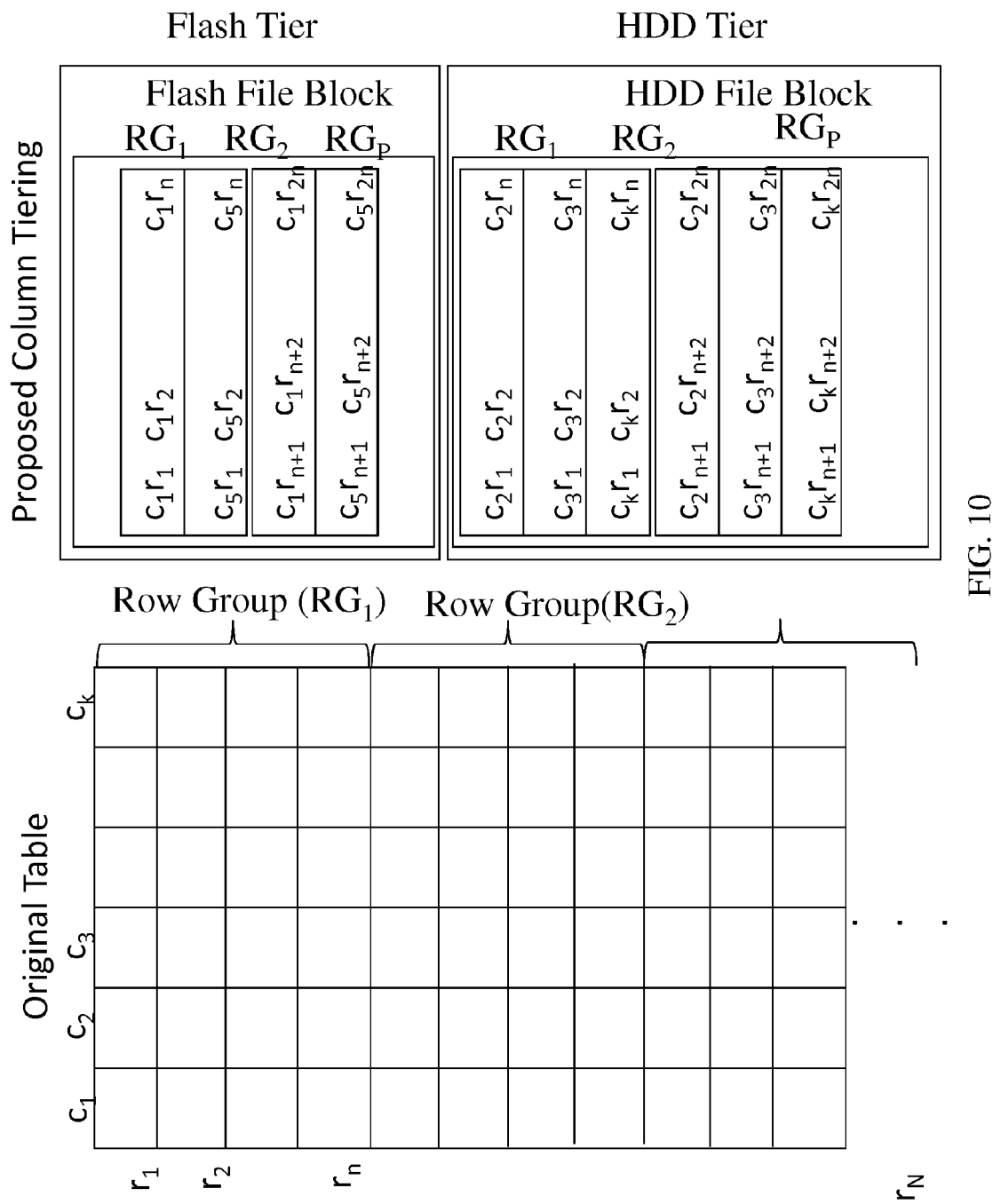
FIG. 10 depicts a database table and a proposed column tiering in a multi-tier storage system used for storing a large analytics database in accordance with an exemplary embodiment.

Technical effects and benefits include a multi-tier storage system for storing a large database in which the initial placement of the columns of the database in the various tiers of the multi-tier storage system is designed to maximize the performance of the large database. FIG. 10 depicts a database table and a proposed column tiering in a multi-tier storage system used for storing a large analytics database in accordance with an exemplary embodiment.

Figure 4:
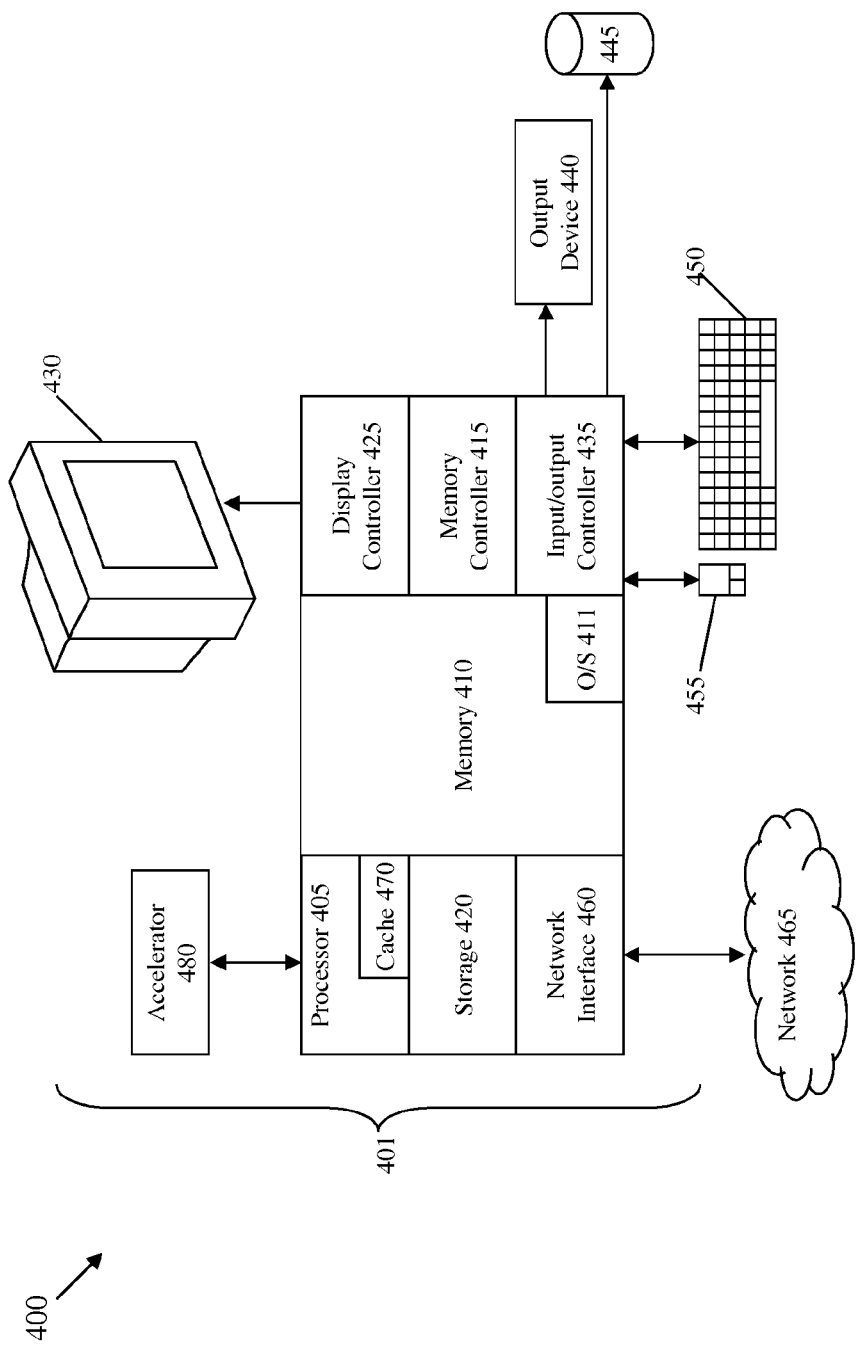
FIG. 4 depicts a block diagram of a computer system for practicing the teachings herein according to an embodiment.

Referring now to FIG. 4, a block diagram of an exemplary computer system 400 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 400 therefore includes general-purpose computer 401.

In an exemplary embodiment, in terms of hardware architecture, as shown in FIG. 4, the computer 401 includes a processor 405, memory 440 coupled via a memory controller 445, a storage device 420, and one or more input and/or output (I/O) devices 440, 445 (or peripherals) that are communicatively coupled via a local input/output controller 435. The input/output controller 435 can be, for example, but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 420 may include one or more hard disk drives (HDDs), solid state drives (SSDs), or any other suitable form of storage.

The processor 405 is a computing device for executing hardware instructions or software, particularly that stored in memory 440. The processor 405 can be any custom made or commercially available processor, a central processing unit (CPU), an auxiliary processor among several processors associated with the computer 401, a semiconductor based microprocessor (in the form of a microchip or chip set), a macro-processor, or generally any device for executing instructions. The processor 405 may include a cache 470, which may be organized as a hierarchy of more cache levels (L1, L2, etc.).

The memory 440 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 440 may incorporate electronic, magnetic, optical, and/or other types of storage media. Note that the memory 440 can have a distributed architecture, where various components are situated remote from one another, but can be accessed by the processor 405.

The instructions in memory 440 may include one or more separate programs, each of which comprises an ordered listing of executable instructions for implementing logical functions. In the example of FIG. 4, the instructions in the memory 440 include a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as Wi-Fi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 440 may further include a basic input output system (BIOS) (omitted for simplicity). The BIOS is a set of essential routines that initialize and test hardware at startup, start the OS 411, and support the transfer of data among the storage devices. The BIOS is stored in ROM so that the BIOS can be executed when the computer 401 is activated.

When the computer 401 is in operation, the processor 405 is configured to execute instructions stored within the memory 440, to communicate data to and from the memory 440, and to generally control operations of the computer 401 pursuant to the instructions. In exemplary embodiments, the computer system 400 includes one or more accelerators 480 that are configured to communicate with the processor 405. The accelerator 480 may be a field programmable gate array (FPGA) or other suitable device that is configured to perform specific processing tasks. In exemplary embodiments, the computer system 400 may be configured to offload certain processing tasks to an accelerator 480 because the accelerator 480 can perform the processing tasks more efficiently than the processor 405.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for predictively placing columns of a database in a multi-tier storage system, the method comprising:
   receiving, by a processor, a database to be stored in the multi-tier storage system, wherein the database comprises a plurality of columns and the multi-tier storage system comprises at least two storage devices;
   evaluating one or more attributes of each of the plurality of columns of the database to assign a score to each of the plurality of columns, wherein the score assigned to each of the plurality of columns is a function of a cardinality of the column and a size of a data stored in the column; and
   storing each of the plurality of columns of the database on one of the at least two storage devices, where a determination of which of the at least two storage devices to store each of the plurality of columns is based on the score assigned to each of the plurality of columns.

2. The method of claim 1, wherein the one or more attributes of each of the plurality of columns of the database comprise at least one of:
a selectivity;
the cardinality;
the size,
a sparsity;
a sort order;
a type;
a usage type; and
a data distribution.

3. The method of claim 1, wherein the determination of which of the at least two storage devices to store each of the plurality of columns is further based on one or more characteristics of each of the at least two storage devices.

4. The method of claim 3, wherein the one or more characteristics comprise at least one of:
a sequential access time;
a random access time;
a data access parallelism;
a capacity;
a sequential bandwidth;
a number of random I/O operations/second; and
a latency.

5. The method of claim 1, further comprising analyzing a query log of queries for the database and generating a weighted columnar relationship graph.

6. The method of claim 5, wherein the determination of which of the at least two storage devices to store each of the plurality of columns is further based on the analysis of the query log.

7. The method of claim 5, wherein analyzing the query log of queries for the database comprises building an intra-query relationship graph between the plurality of columns and assigning a weight to each relationship between connected columns.

8. A computer program product for predictively placing columns of a database in a multi-tier storage system, the computer program product comprising:
a computer readable storage medium having program code embodied therewith, the program code executable by a computer to:
receive the database to be stored in the multi-tier storage system, wherein the database comprises a plurality of columns and the multi-tier storage system comprises at least two storage devices;
evaluate one or more attributes of each of the plurality of columns of the database to assign a score to each of the plurality of columns, wherein the score assigned to each of the plurality of columns is a function of a cardinality of the column and a size of a data stored in the column; and
store each of the plurality of columns of the database on one of the at least two storage devices,
where a determination of which of the at least two storage devices to store each of the plurality of columns is based on the score assigned to e each of the plurality of columns.

9. The computer program product of claim 8, wherein the one or more attributes of each of the plurality of columns of the database comprise at least one of:
a selectivity;
the cardinality;
the size,
a sparsity;
a sort order;
a type;
a usage type; and
a data distribution.

10. The computer program product of claim 8, wherein the determination of which of the at least two storage devices to store each of the plurality of columns is further based on one or more characteristics of each of the at least two storage devices.

11. The computer program product of claim 10, wherein the one or more characteristics comprise at least one of:
a sequential access time;
a random access time;
a capacity; and
a latency.

12. The computer program product of claim 8, wherein the program code executable by the computer is further operable to analyze a query log of historical queries for the database.

13. The computer program product of claim 12, wherein the determination of which of the at least two storage devices to store each of the plurality of columns is further based on the analysis of the query log.

14. A multi-tier storage system comprising:
a first storage device;
a second storage device;
a computer system in communication with the first storage device and the second storage device, wherein the computer system manages data stored on both the first storage device and the second storage device;
the computer system comprising a processor that is further configured to:
receive a database to be stored in the multi-tier storage system, wherein the database comprises a plurality of columns;
evaluate one or more attributes of each of the plurality of columns of the database to assign a score to each of the plurality of columns, wherein the score assigned to each of the plurality of columns is a function of a cardinality of the column and a size of a data stored in the column; and
store each of the plurality of columns of the database on one of the first storage device or the second storage device,
where a determination of which of the first storage device and the second storage device to store each of the plurality of columns is based on the score assigned to each of the plurality of columns.

15. The multi-tier storage system of claim 14, wherein the one or more attributes of each of the plurality of columns of the database comprise at least one of:
a selectivity;
the cardinality;
the size;
a sort order;
a type;
a usage type;
a sparsity; and
a data distribution.

16. The multi-tier storage system of claim 14, wherein the determination of which of the first storage device and the second storage device to store each of the plurality of columns is further based on one or more characteristics of each of the first storage device and the second storage device.

17. The multi-tier storage system of claim 16, wherein the one or more characteristics comprise at least one of:
   a sequential access time;
   a random access time;
   a data access parallelism;
   a capacity; and
   a latency.

18. The multi-tier storage system of claim 14, wherein the computer system is further configured to analyze a query log of historical queries for the database.

19. The multi-tier storage system of claim 18, wherein the determination of which storage devices to store each of the plurality of columns is further based on the analysis of the query log.

* * * * *